UNITED STATES PATENT OFFICE.

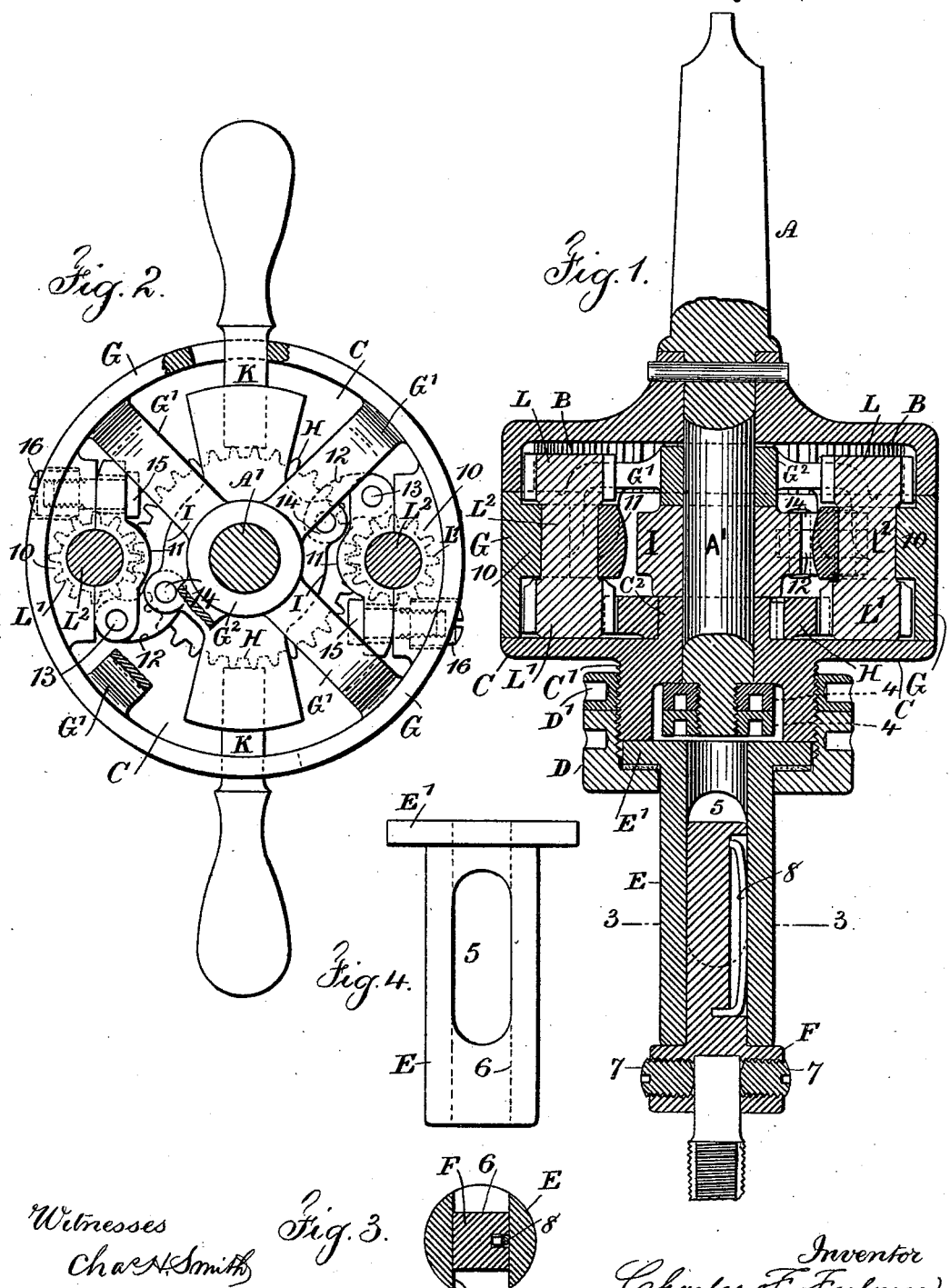

CHARLES F. FULMER, OF PLAINFIELD, NEW JERSEY, ASSIGNOR TO HIMSELF AND SAMUEL A. CLOUSTON, OF SAME PLACE.

TAPPING-TOOL.

SPECIFICATION forming part of Letters Patent No. 582,733, dated May 18, 1897.

Application filed November 13, 1895. Renewed February 5, 1897. Serial No. 622,204. (No model.)

*To all whom it may concern:*

Be it known that I, CHARLES F. FULMER, a citizen of the United States, residing at Plainfield, in the county of Union and State of New Jersey, have invented an Improvement in Tapping-Tools, of which the following is a specification.

Tapping-tools have been connected frictionally with a rotating head by which such tools have been rotated during the tapping operation, and such frictional connection has allowed the tool to remain stationary after the tapping has been performed, while the power that has driven the same may continue to rotate the stock or head carrying such tool, and in some instances bevel-gears have been made use of for reversing the rotary movement when the tap is to be unscrewed or withdrawn.

In my present improvement I make use of an internal gear and a pinion intervening between such internal gear and a straight gear upon the stock of the tool-carrier, and a frictional connection is provided for preventing the pinion rotating when the tap is being screwed into its hole, and handles are provided the grasping of which releases the friction that has held the pinion from revolving and at the same time causes the rotary head and its internal gear to act through the pinion upon the tool-holding socket to reverse the direction of rotation and unscrew the tap, the speed of rotation in withdrawing the tap being greater than that applied to the tap when cutting the screw-thread within the hole.

In the drawings, Figure 1 is a vertical section, and Fig. 2 is a horizontal plan with the internal gear removed and with the spindle and pinion shafts in section. Fig. 3 is a horizontal plan at the line 3 3 of Fig. 1, and Fig. 4 is an elevation of the tool-holding socket.

The shank A is adapted to pass into the revolving shaft or head of any suitable lathe or drilling apparatus, and this shank is extended as a spindle A', upon the lower end of which nuts 4 are screwed, the one acting as a locknut for the other to prevent the parts unscrewing, and the internal gear B has a hollow hub permanently connected to the shank and spindle, and there is a disk C, through the center of which passes the spindle A', and the nuts 4 are received within the recessed end or hub C' of such disk, so that the disk and hub are held in position by the nuts 4, but the hub and disk are free to be rotated around the spindle.

The hub C' is screw-threaded on its exterior surface and receives the screw-ring D and the lock-nut D', and there is a tubular socket E that passes through the screw-ring D, and the annular flange E' of such tubular socket is received into the space between the flange of the screw-ring D and the lower end of the hub C', and by setting up this screw-ring D more or less friction can be applied to the annular flange E, and there may be one or more leather washers between the respective parts, so that the friction may be regulated, because the friction applied at this part is to be sufficient for rotating the tapping-tool during the operation of cutting the screw-thread within a perforation, and such friction will allow the parts to continue to rotate after the tap may have bottomed in the hole that is being threaded, thereby preventing injury to the screw-threading tap.

The interior of the tubular socket E is made by boring a hole longitudinally through the same and then cutting a transverse mortise 5 of the same width as the diameter of the hole, so that the faces of this transverse mortise will be tangential to the central hole in the socket, and the lower end of the hole is squared, as at 6, the object of this construction being to fit the socket for the reception of a square tool-holder F, the size of which corresponds to the transverse mortise 5, and the square hole continuing therefrom down to the lower end of the tubular socket, so that this tool-holder F can be inserted into the tubular socket and will be rotated thereby, and the lower end of the tool-holder is hollow for the reception of the shank of the tool, and there are screws at 7 for clamping the tap or other tool that is received into the apparatus; and I prefer to groove one of the flat faces of the tool-holder F for the reception of a friction-spring 8, the strength of which is sufficient for holding the tool-holder F into the tubular socket E and for permitting such tool-holder to move down and partially out of the tubular socket as the drill may be drawn into the hole that is being tapped by the action of the screw, or the tool-holder can be drawn out from the tubular socket, the friction-spring yielding in this operation, and another tool and its holder may be inserted. This facilitates the changing of the apparatus from a boring instrument to a screw cutting or tapping instrument, or the reverse.

The cylinder G fills in the space between the lower edge of the internal gear B and the upper surface of the disk C, and there are arms $G^7$ and a hub $G^2$ extending from the cylinder G and surrounding the spindle $A'$, such hub being loose upon the spindle, and there is a short cylinder $C^2$ projecting upwardly from the disk C and receiving upon it the gear-wheel H and a ring I around the spindle $A'$ and between the cylindrical hub $C^2$ and the hub $G^2$, and from this ring I arms K project through slots in the cylinder G and terminate as handles.

The pinions L L' are at the top and bottom ends and integral with shafts $L^2$, and these pinions gear, respectively, with the internal gear B and the gear-wheel H, and the shafts $L^2$ are received into and supported by the bearings 10, that are integral with and inside of the cylinder G, and the half-bearings 11 are at the opposite sides of the shafts $L^2$ to the bearings 10, and each of these half-bearings 11 is provided with a toggle-link 12, pivoted at 13 at one end to the half-bearings 11 and at the other end to a knuckle 14 upon the ring I, and the opposite ends of the half-bearings are provided with adjusting and holding bolts 15, that pass through the half-bearings and are provided with nuts 16, by which the parts can be adjusted. It is now to be understood that when the handles K are turned in one direction the knuckles 14 and toggle-links are brought into substantially radial lines and press the half-bearings 11 outwardly, so as to clamp and firmly hold the shafts $L^2$ between such half-bearings 11 and the half-bearings 10 within the cylinder G, and when in this position the parts are held by the friction upon the shafts $L^2$, so that the disk C rotates with and at the same speed as the spindle and internal gear, and while the parts are in this position the tapping-tool will be brought into action to tap the screw-thread within the hole, and when the tapping operation has been performed the handles K are grasped by the attendant. The spindle and cylinder G continuing to move causes the links 12 to swing, so as to draw back the half-bearings 11 from the shafts $L^2$ sufficiently to relieve the friction upon such shafts, the lengths of the slots in the cylinder G for the arms or handles K determining the extent of this movement, and the cylinder G will now be held stationary and the internal gear B will revolve the pinions L and L' and rotate the gear-wheel H and the disk C in the opposite direction to the previous movement, and thereby the tool-holding devices will be rotated around the lower end of the spindle and in such a direction as to withdraw the tap or tool, and in consequence of the internal gear B being larger than the gear-wheel H the tap will be rotated at a faster speed when being withdrawn than it will be when the screw-thread is being cut, and by this means a saving will be effected in the time employed in the tapping operation and there will not be any risk of injuring the tapping-tool.

In consequence of the tool-holder F having a square shank within the square hole in the socket E a movement can be given to the tool-holder F endwise, both in tapping the tool and in withdrawing the tap.

I claim as my invention—

1. The combination with the rotating spindle and an internal gear carried by the same, of a tool-holder and a gear-wheel therewith connected, supported by the spindle and free to rotate around the same, pinions and shafts for the same parallel with the axis of the spindle and intervening between the internal gear and the gear-wheel, and means for preventing the rotation of the pinions while the apparatus is revolving as a whole and for supporting and holding the shafts of the pinions while being rotated by the internal gear and giving a reverse movement to the gear-wheel and tool-holding device, substantially as set forth.

2. The combination with the spindle, of an internal gear permanently connected therewith, a disk and a gear-wheel connected with the disk, a screw-threaded hub projecting from the opposite side of the disk to the gear-wheel, a tubular socket having a flange at its upper end, a screw-ring screwed upon the hub and receiving and holding the flange of the tubular socket, a cylinder between the disk and the internal gear, pinions engaging the internal gear and the gear-wheel respectively and having shafts, there being half-bearings within the cylinder for such shafts, and movable half-bearings and mechanism for acting upon the same to clamp the shafts and pinions or to release the same and hold the ring while the gear is revolving for reversing the direction of rotation of the tool, substantially as set forth.

3. The combination with the spindle, of an internal gear fastened to and surrounding such spindle, a disk through which the spindle passes, and nuts for attaching the disk to the spindle but allowing the disk to rotate upon the spindle, a gear-wheel attached to the disk, straight gear-pinions and their shafts meshing with the internal gear and the gear-wheel respectively, a cylinder having inwardly-projecting arms and a hub around the spindle and having half-bearings for the shafts of the pinions, a ring around the spindle having projecting arms and handles, half-bearings for the shafts of the pinions, screw-bolts for connecting the half-bearings at one end to the ring, and toggle-links intervening between the other ends of the half-bearings and the ring with which the handles are connected for applying a clamping friction to hold the shafts of the pinions or simultaneously to release the said shafts and hold the cylinder from rotating, substantially as set forth.

Signed by me this 7th day of November, 1895.

CHARLES F. FULMER.

Witnesses:
WILLIAM NEWCORN,
FRANK POLITEES.